United States Patent
Marquet et al.

(10) Patent No.: US 7,461,590 B2
(45) Date of Patent: Dec. 9, 2008

(54) SYSTEM FOR COOKING AND THEN COOLING FOOD PRODUCTS BY IMMERSION IN A HEAT TRANSFER FLUID

(75) Inventors: Olivier Marquet, Parc d'Activités de Brocéliande (FR); Bernard Cadoret, Parc d'Activités de Brocéliande (FR)

(73) Assignee: Armor Inox SA, Mauron (FR)

( * ) Notice: Subject to any disclaimer, the term of this patent is extended or adjusted under 35 U.S.C. 154(b) by 374 days.

(21) Appl. No.: 11/332,984

(22) Filed: Jan. 17, 2006

(65) Prior Publication Data

US 2006/0174774 A1   Aug. 10, 2006

(30) Foreign Application Priority Data

Jan. 17, 2005   (FR)   ................................. 05 00490

(51) Int. Cl.
*A23L 1/00* (2006.01)
(52) U.S. Cl. ........................... 99/355; 99/323.1; 99/330
(58) Field of Classification Search ........... 99/352–355, 99/327–333, 348, 323.1, 323.3, 516, 494; 426/510–511, 523; 261/64.1, 87, 93, 102; 366/101–106, 326.1
See application file for complete search history.

(56) References Cited

U.S. PATENT DOCUMENTS

| 4,944,598 | A | * | 7/1990 | Steele | 366/106 |
|---|---|---|---|---|---|
| 6,036,357 | A | * | 3/2000 | Van Drie | 366/332 |
| 6,599,426 | B2 | * | 7/2003 | Drie | 210/629 |
| 6,629,773 | B2 | * | 10/2003 | Parks | 366/107 |
| 7,083,324 | B2 | * | 8/2006 | Van Drie | 366/335 |
| 7,267,475 | B2 | * | 9/2007 | Steele | 366/101 |
| 2006/0102007 | A1 | * | 5/2006 | Martin | 99/275 |

\* cited by examiner

*Primary Examiner*—Timothy F. Simone
(74) *Attorney, Agent, or Firm*—Gerald E. Helget; Nelson R. Capes; Briggs and Morgan P.A.

(57) ABSTRACT

A system for cooking and then cooling food products by immersion in a heat transfer fluid, consisting of a vessel (200) to contain the heat transfer fluid and a system (500) for homogenization by blowing gas bubbles into the heat transfer fluid from a gas bubble formation system (530). The vessel (200) is closed by a cover (250) leaving a space above the maximum level of the free surface of the heat transfer fluid. Homogenization is accomplished by closed circulation of gas contained in the space above the heat transfer fluid which generates bubbles in the heat transfer fluid.

8 Claims, 3 Drawing Sheets

US 7,461,590 B2

SYSTEM FOR COOKING AND THEN COOLING FOOD PRODUCTS BY IMMERSION IN A HEAT TRANSFER FLUID

CROSS-REFERENCE TO RELATED APPLICATION

The present application is based on and claims priority of French patent application Serial No. 05/00490, filed Jan. 17, 2005, the content of which is hereby incorporated by reference in its entirety.

BACKGROUND OF THE INVENTION

The present invention concerns a system of cooking and then cooling food products by a immersion in a heat transfer fluid, the said system being of the type consisting of a vessel and a system for homogenisation by blowing in gas bubbles.

In order to carry out the cooking of certain food products and in particular that of hams, one method consists of placing the hams in moulds which are deposited in a superimposed fashion in an enclosure which is closed by a cover. The enclosure is then filled with a heat transfer fluid previously heated and admitted so that it can suitably cook the hams. After cooking, the enclosure is drained of its fluid and is then filled with a previously refrigerated fluid in order then to cool the hams which have been cooked. At the end of cooling, the enclosure is drained once again, the cover is removed and the moulds are extracted from the enclosure and then discharged to an area for removing the hams from the moulds.

In order to homogenise the temperature of the heat transfer fluid in such an enclosure both in the cooking phase and in the cooling phase so as in particular better to control the said phases, it is known how to use means of homogenisation by blowing gas bubbles into the fluid contained in the said enclosure. More precisely, bubbles, generally air, are thus injected into the heat transfer fluid at the lower level of the enclosure, which creates a continual ascending stirring in it so that the measured temperature of the fluid, at various levels inside the enclosure, is homogeneous.

The problem nevertheless posed by this type of means of homogenisation by blowing in gas bubbles is the exchange of heat that may take place between the gas bubbles and the heat transfer fluid. This is because the gas used for blowing in the bubbles is at a temperature, for example ambient temperature, which is never that of the heat transfer fluid. Thus, generally in the case of a gas at ambient temperature, in the cooking phase, the heat transfer fluid is cooled by the gas blown in, and conversely, in the cooling phase, the heat transfer fluid is heated. The result is an extension of the phases mentioned above unless a compensation is made by a supplementary addition of heat or cold (according to circumstances) to the heat transfer fluid, which nevertheless gives rise to an excessive consumption of energy.

SUMMARY OF THE INVENTION

The aim of the invention is therefore to propose an enclosure intended to contain a heat transfer fluid for cooking or cooling food products by immersion, the said enclosure being provided with means of homogenisation by blowing in gas bubbles which does not have the aforementioned drawbacks.

To this end, a system of cooking and then cooling food products by immersion in a heat transfer fluid consists of a vessel intended to contain the said heat transfer fluid and a system for homogenisation by blowing gas bubbles into the said heat transfer fluid by means of a gas bubble formation system. It is characterised in that the said vessel is closed by a cover so as to leave a space above the maximum level of the free surface of the said heat transfer fluid, and in that the said homogenisation system comprises a closed circulation system for the gas contained in the said space to the said system provided for generating gas bubbles in the said heat transfer fluid.

Advantageously, when the said cooking system comprises a stirring system provided for establishing a closed circuit for circulation of the heat transfer fluid passing through the said vessel, the said closed circulation system for the gas contained in the said space to the said bubble formation system consists of a venturi device in the said heat transfer fluid circulation circuit established by the said stirring system.

Advantageously, the heat transfer fluid put in circulation by the stirring system passes through the said bubble formation system.

In one advantageous embodiment, the said bubble formation system comprises at least one distributor consisting of a plate lying on the bottom wall of the said vessel with a multitude of holes in it.

In another embodiment, the said bubble formation system comprises at least one distributor consisting of at least one elbow mounted so as to rotate freely in line with the outlet in the vessel of the said closed circuit for circulation of the heat transfer fluid of the stirring system and designed to be able to turn during the flow of heat transfer fluid.

Advantageously, the or each outlet of the said closed circuit for circulation of heat transfer fluid of the stirring system is positioned so as not to project on the internal face of the bottom wall of the said vessel. For example, a grille is disposed at the discharge of the or each outlet in the vessel of the said closed circuit for circulation of the heat transfer fluid of the stirring system.

The characteristics of the invention mentioned above, as well as others, will emerge more clearly from a reading of the following description of an example embodiment, the said description being given in relation to the accompanying drawings, amongst which:

DETAILED SPECIFICATION

Figure 1:
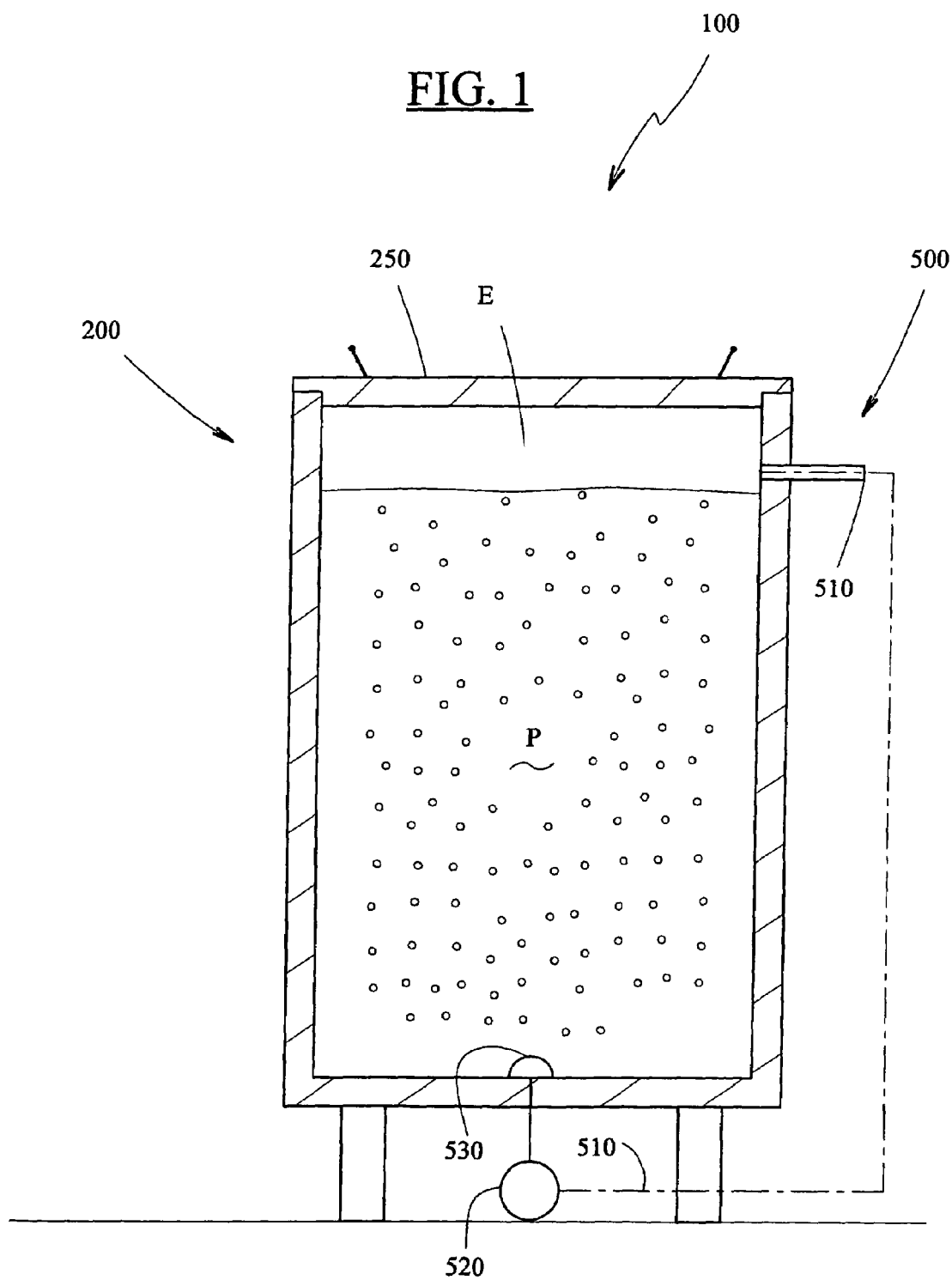
FIG. 1 depicts a view in section of a system for cooking food products illustrating the principle of the present invention.

FIG. 1 depicts a system 100 for cooking food products which illustrates the principle of the present invention. It comprises essentially a vessel 200 intended to contain a heat transfer fluid P and closed by a cover 250 and a system 500 for homogenisation by blowing gas bubbles into the heat transfer fluid P contained in the vessel 200.

For reasons of clarity, the system for supplying the vessel 200 with the heat transfer fluid P has not been shown in this FIG. 1.

The system 500 of homogenisation by blowing in gas bubbles for its part consists of a pipe 510, a first end of which, referred to as the upstream end, opens out inside the vessel 200 in a space E situated above the maximum level of the free surface of the heat transfer fluid P in the vessel 200 and the other end of which, referred to as the downstream end, is connected to the inlet of a system 520 for the closed circulation of gas, the outlet of which opens out in a bubble formation system 530. This system 530 can consist of any appropriate means allowing the formation of bubbles in a liquid.

The operating principle of such a cooking system is as follows. The gas contained in the vessel 200 above the level of the heat transfer fluid P contained in the vessel 200 is caused by the circulation system 520 to circulate in closed circuit from the space E in the top part of the vessel 200 to the bottom part of the latter where, through the bubble formation system 530, it forms gas bubbles in the heat transfer fluid which, rising in the fluid, homogenises the temperature of the latter before once again emerging in the top part of the vessel. Thus, because of this closed circulation, the temperature of the gas contained in the top part of the vessel and forming gas bubbles is substantially the same as the temperature of the heat transfer fluid. As a result there are no longer the heat exchanges between bubbles and fluid which characterised the cooking systems of the prior art and which caused losses of heat energy.

Figure 2:
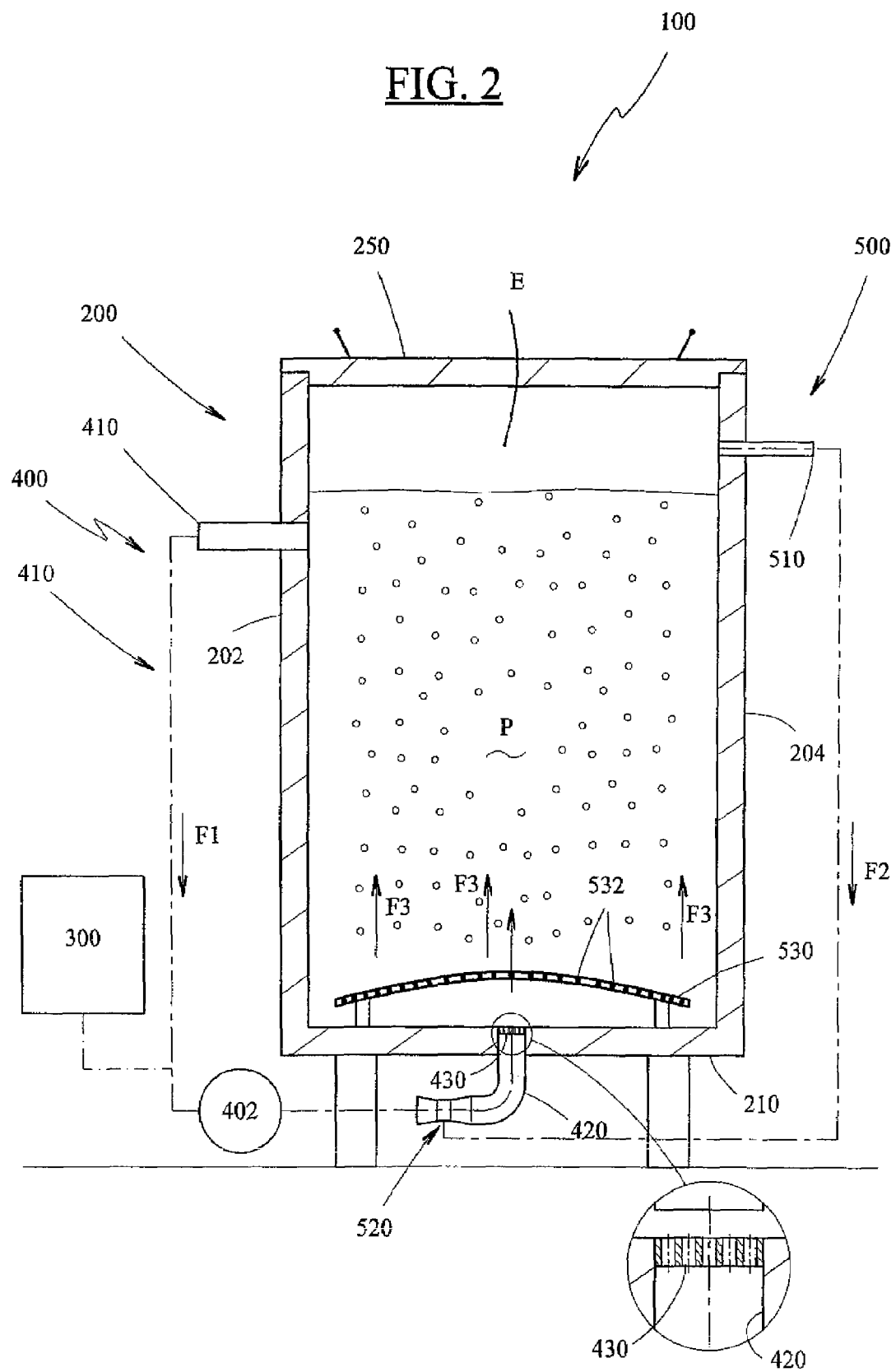
FIG. 2 depicts a view in section of a system for cooking food products according to an advantageous embodiment of the present invention.

FIG. 2 depicts an embodiment of a cooking system according to the present invention implementing the principle illustrated in FIG. 1. This system is for example intended for cooking hams. Although only this application is described in the remainder of the present description, it will be understood that the present invention in not limited to this particular application.

This cooking system 100 comprises essentially a vessel 200 intended to contain a heat transfer fluid and closed by a cover 250, a system 300 for supplying the vessel 200 with heat transfer fluid, a system 400 for stirring the heat transfer fluid contained in the vessel 200 and a system 500 for homogenisation by blowing gas bubbles into the heat transfer fluid contained in the vessel 200.

The vessel 200 consists of an envelope forming a container and closed by the cover 250.

In the example embodiment depicted, this envelope is parallelepipedal and comprises lateral walls 202 and a bottom 210. The face of this envelope which is intended to be turned upwards is closed by the cover 250 so as to leave a space E above the maximum level of the free surface of the said heat transfer fluid P. The walls of the vessel 200 and of the cover 250 are insulating from a thermal point of view. The vessel 200 is designed to contain a heat transfer fluid P, such as water, the temperature of which is such that this heat transfer fluid, in the cooking phase, allows the cooking of the food products immersed in the vessel 200 and, in a cooling phase, allows the cooling of the said food products. It should be noted that these food products can be disposed in suitable moulds, for example stacked in the vessel 200.

The fluid supply system 300 makes it possible either to fill the vessel 200 with a heat transfer fluid P up to a level such that the top part of the vessel 200 is free to contain a gas, or to drain it. The fluid supply system 300 comprises a device designed to heat or cool the heat transfer fluid and an associated pumping device which is not shown.

The stirring system 400 comprises a pump 402 connected on the one hand to an inlet conduit 410 opening out in the vessel 200 through a lateral wall 202 and on the other hand a connecting conduit 420 opening out in the vessel 200 through the bottom wall 210. The inlet conduit 410 opens out in the vessel 200 at a location situated below the maximum optimum filling level, that is to say the level at which the food products contained in the vessel 200 are completely immersed.

The functioning of the pump 402 is such that the heat transfer fluid P is sucked through the conduit 410, as shown by the arrows F1 in FIG. 2, and is pumped into the vessel 200, thus creating a stirring of the heat transfer fluid contained in the vessel 200, so that the various products contained in the vessel are immersed in a fluid whose temperature is almost constant at a given moment. There are thus obtained, by virtue of this circulation of the heat transfer fluid in a loop in the vessel 200, cooking and cooling that are almost identical for all the hams contained in the vessel 200, and this whatever their location in the vessel 200.

In the bottom of the vessel, there is found the said bubble formation system 530, which here comprises a distributor consisting of a plate extending over the bottom wall 210 of the said vessel 200, with a multitude of holes 532 in it. The gas circulation system 520 is also found, which consists here of a venturi device.

The pipe 510 can be seen, a first end of which, referred to as the upstream end, opens out inside the vessel 200 above the maximum level of the heat transfer fluid P, and the other end of which, referred to as downstream, is connected to the inlet of the venturi device.

The functioning of the pump 402 causes, as described above, a circulation of the heat transfer fluid, in particular in the connecting conduit 420. This circulation of the heat transfer fluid in its turn causes, by venturi effect in the venturi device 520, a suction, via the pipe 510, of the gas present in the space E situated above the level of the heat transfer fluid in the vessel 200, as shown by the arrows F2 in FIG. 3, and a mixing of this sucked gas with the heat transfer fluid in the pipe 420. This mixture of heat transfer fluid and gas passes through the bubble formation system 530, which has the effect, as indicated by the arrows F3, of forming gas bubbles. The temperature of the gas injected into the heat transfer fluid is thus substantially the same as that of the heat transfer fluid so that the stirring of the heat transfer fluid by the gas bubbles does not modify its temperature.

The injection of gas bubbles into the heat transfer fluid stirring system 400 increases the efficacy of the stirring of the fluid, which reduces the durations of the cooking and cooling phases for the food products contained in the vessel 200.

One advantage of the embodiment in FIG. 2 lies in the fact that the generation of bubbles in the heat transfer fluid is carried out without its being necessary to use a specific pump or a pneumatic compressor conventionally used for injecting air into the vessel, which might pollute the air injected and consequently the heat transfer fluid.

In the example described in relation to FIG. 2, the bubble formation system 530 consists of a distributor, for example a curved plate with a multitude of holes 532 in it forming a bubble formation means. It should be noted that it could consist of several such distributors.

Likewise, it could also be a case of an elbow mounted so as to rotate freely in line with the outlet of the connecting conduit 420 and which would be able to turn during the flow of the heat transfer fluid through the outlet of the connecting conduit 420. The means of driving the elbow in rotation can take the form of an orifice produced laterally in the wall of the elbow at its discharge and a deflector placed in the outlet of the elbow at its discharge.

It should be noted that the outlet of the connecting conduit 420 is below the distributor 530.

Advantageously, it is positioned so as not to project on the internal face of the bottom wall 210. Through this design, it is possible to drain the vessel 200 completely when this proves necessary.

A grille 430 is disposed at the discharge of the outlet of the connecting conduit 420 in the vessel 200. This grille 430, during draining, prevents the formation of a vortex effect in the stream of heat transfer fluid, and the retention of any food waste contained in the heat transfer fluid. During the filling of the vessel, the grille 430 also makes it possible to calibrate the size of the bubbles contained in the stream of heat transfer fluid.

It should be noted that the filling pipes of the fluid supply system 300 are connected to the connecting conduit 420 so that, during the operation of filling the vessel 200, the heat transfer fluid P is stirred. It should also be noted that, during the operation of draining the vessel 200, the heat transfer fluid P is discharged through the connecting conduit 420 without passing through the bubble formation system 530. A complete drainage of the vessel 200 can thus be carried out.

Figure 3:
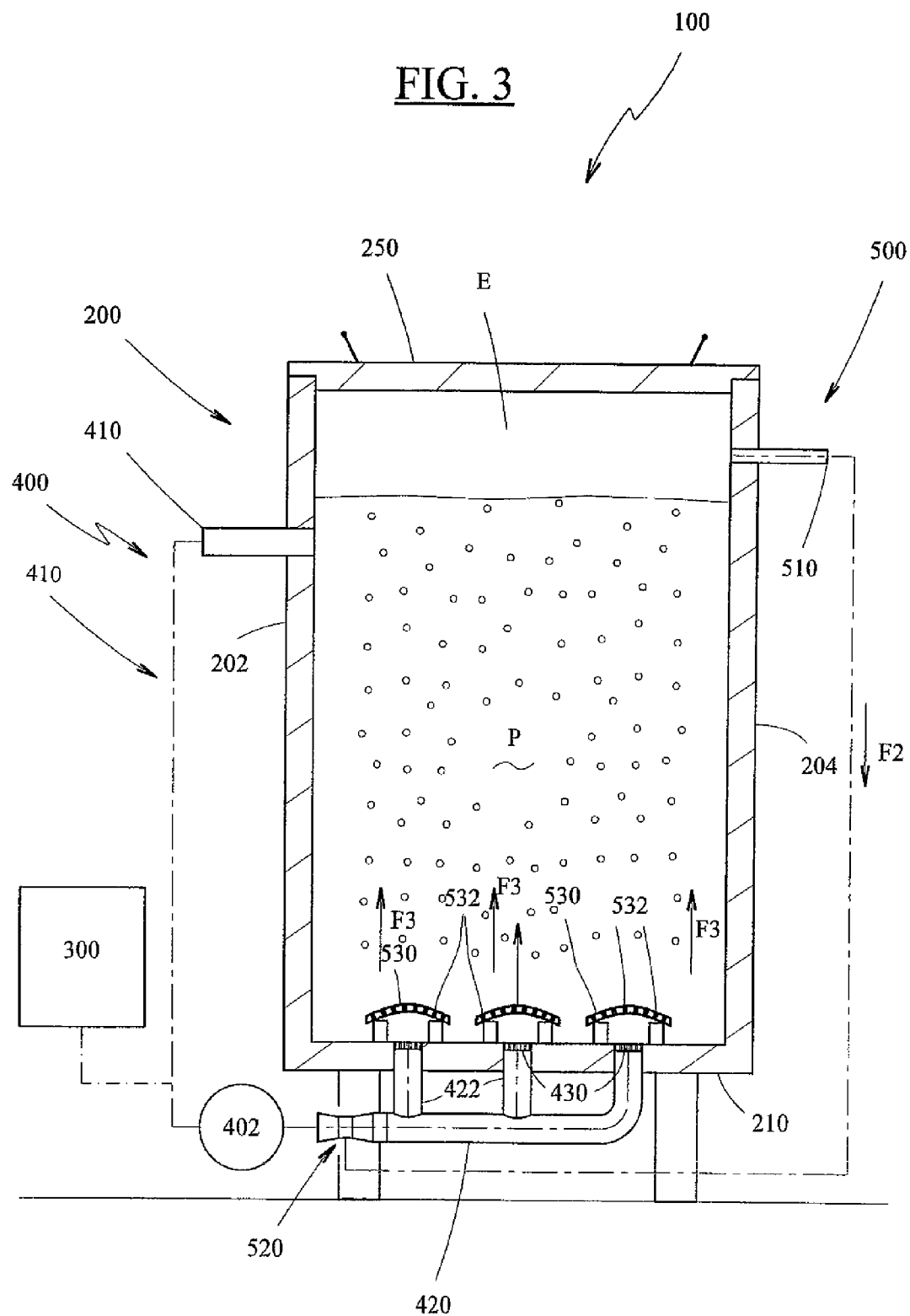
FIG. 3 depicts a view in section of a variant embodiment of a system for cooking food products according to an advantageous embodiment of the present invention.

In a variant embodiment of the enclosure 100 depicted in FIG. 3, at least one intermediate conduit 420 is connected with the connecting conduit 420 and opens out through the bottom wall 210. Two intermediate conduits 420 are depicted in this FIG. 3. Like the connecting conduit 420, these intermediate conduits 422 open out opposite two distributors constituting the bubble formation system 530. Grilles 430 can respectively be disposed at the discharge of the outlets of the intermediate conduits 422 in the vessel 200.

Several distributors 530 can thus be disposed parallel to one another so as to cover the bottom wall 210, which makes it possible to obtain a stirring of the heat transfer fluid throughout the whole transverse section of the vessel 200. Where the food products are contained in stacked moulds, each distributor 530 is designed so as to be able to be disposed under a stack of moulds.

Although this is not shown, it should be noted that a single distributor 530 covering the whole of the bottom wall 210 could replace all the distributors 450 depicted in FIG. 3.

The invention claimed is:

1. A cooking and cooling system for food products by immersion in a heat transfer fluid, the heat transfer fluid having a free surface, the free surface having a maximum level, the cooking and cooling system comprising:
a vessel (200) intended to contain the heat transfer fluid and a homogenization system (500) for blowing gas bubbles into the heat transfer fluid by way of a gas bubble formation system (530), wherein the vessel (200) is closed by a cover (250) so as to leave a space above the maximum level of the free surface of the heat transfer fluid, and wherein the homogenization system (500) further comprises a closed gas circulation system (520) for creating a direct closed circulation of the gas contained in the space to the gas bubble formation system (530).

2. The cooking system of claim 1, further comprising a stirring system (400) for establishing a fluid closed circuit for circulation of the heat transfer fluid passing through the vessel (200), and the closed gas circulation system (520) for the closed circulation of the gas contained in the space to the bubble formation system (530) includes a venturi device in the heat transfer fluid circulation circuit established by the stirring system (400).

3. The cooking system of claim 2, wherein the stirring system comprises an inlet conduit (410) through which the heat transfer fluid is sucked from the vessel, and a connecting conduit (420) through which the heat transfer fluid is transferred to the bubble formation system (530), and wherein the inlet conduit (410) opening in the vessel is at a location situated below the maximum level of the heat transfer fluid.

4. The cooking system of claim 3, wherein the bubble formation system (530) is at the bottom of the vessel.

5. The cooking system of claim 1, wherein in the gas bubble formation system (530) comprises at least one distributor consisting of a plate extending over a bottom wall (210) of the vessel (200) with a multitude of holes (532) in it.

6. The cooking system of claim 5, wherein the gas bubble formation system (530), comprises another distributor consisting of at least one elbow mounted free to rotate in line with an outlet in the vessel (200) for the closed circuit circulation of heat transfer fluid of the stirring system (400) being designed to be able to turn during the flow of the heat transfer fluid.

7. The cooking system of claim 5, wherein the outlet of the closed circuit for circulation of the heat transfer fluid of the stirring system (400) is positioned so as not to project from an internal face of the bottom wall (210) of the vessel (200).

8. The cooking system of claim 6, further comprising a grille (430) disposed at a discharge of the outlet in the vessel (200) of the closed circuit for circulation of the heat transfer fluid of the stirring system (400).

* * * * *